US012288538B2

(12) United States Patent
Wu et al.

(10) Patent No.: US 12,288,538 B2
(45) Date of Patent: Apr. 29, 2025

(54) DISPLAY CONTROL METHOD AND ELECTRONIC DEVICE

(71) Applicant: Lenovo (Beijing) Limited, Beijing (CN)

(72) Inventors: Hao Wu, Beijing (CN); Dunfei Zhou, Beijing (CN); Wei Liu, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 18/511,756

(22) Filed: Nov. 16, 2023

(65) Prior Publication Data
US 2024/0221703 A1 Jul. 4, 2024

(30) Foreign Application Priority Data
Dec. 31, 2022 (CN) .......................... 202211734692.3

(51) Int. Cl.
G09G 5/12 (2006.01)
G09G 3/34 (2006.01)
G09G 3/36 (2006.01)

(52) U.S. Cl.
CPC ............... G09G 5/12 (2013.01); G09G 3/344 (2013.01); G09G 3/3607 (2013.01); G09G 2340/0464 (2013.01); G09G 2356/00 (2013.01); G09G 2360/04 (2013.01); G09G 2370/04 (2013.01)

(58) Field of Classification Search
CPC ...... G06F 1/1618; G06F 1/162; G06F 1/1621; G06F 1/1647; G06F 1/1616; G06F 1/1677; G06F 1/1681; G06F 1/1643; G06F 1/3265; G06F 1/1652; G06F 1/325; G06F 1/1615; G06F 1/1622; G06F 1/1675; G06F 3/04886; G06F 3/1423; G06F 3/0346; G06F 2200/1637; G09G 3/344; G09G 3/3607; G09G 3/035; G09G 5/12; G09G 2380/02; G09G 2340/0464; G09G 2340/14; G09G 2370/04; G09G 2360/04; G09G 2356/00; H04M 1/0268; H04M 1/0214; H04M 1/0243; H04M 1/0216
See application file for complete search history.

(56) References Cited
U.S. PATENT DOCUMENTS 7,932,882 B2 * 4/2011 Shimotono ............. G06F 1/162
345/87
9,245,492 B2 * 1/2016 Ackley ................ G09G 3/3406
(Continued)

Primary Examiner — Robin J Mishler
Assistant Examiner — Amen W Bogale
(74) Attorney, Agent, or Firm — ANOVA LAW GROUP, PLLC

(57) ABSTRACT

A display control method includes determining a first relative positional relationship between a first surface and/or a second surface of a first body of an electronic device and a first surface of a second body of the electronic device, the first relative positional relationship being related to at least one of a first rotation and a second rotation of the first body relative to the second body, a first display unit being disposed on the first surface of the first body, a second display unit being disposed on the second surface of the first body, the first rotation and the second rotation being different types of spatial rotation; and controlling at least one of the first display unit and the second display unit to be in a working state based on the first relative positional relationship.

18 Claims, 7 Drawing Sheets

(56) References Cited

U.S. PATENT DOCUMENTS

| | | | |
|---|---|---|---|
| 2012/0155005 A1* | 6/2012 | Lee | G06F 1/162 |
| | | | 361/679.01 |
| 2013/0155592 A1* | 6/2013 | Takahashi | G06F 1/1669 |
| | | | 361/679.08 |
| 2013/0314348 A1* | 11/2013 | Luo | G09G 5/003 |
| | | | 345/173 |
| 2015/0286249 A1* | 10/2015 | Chvatal | G06F 1/1681 |
| | | | 361/679.07 |
| 2024/0077915 A1* | 3/2024 | Zheng | G06F 1/1622 |
| 2024/0220180 A1* | 7/2024 | Gao | G06F 1/162 |
| 2024/0231737 A1* | 7/2024 | Ma | G06F 3/1446 |

* cited by examiner

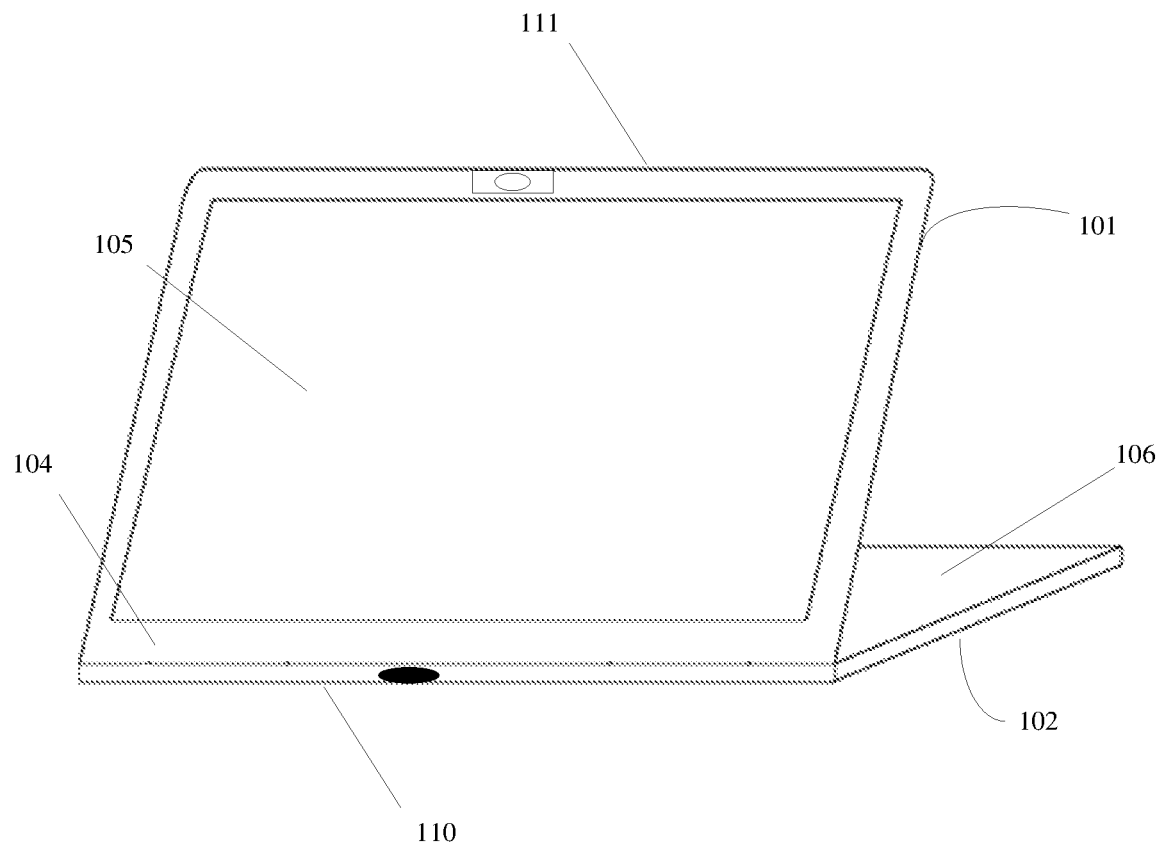

FIG. 4

501 Determine a first relative positional relationship between the first surface and/or the second surface of the first body of the electronic device and the first surface of the second body of the electronic device 502 Control at least one of the first display unit and the second display unit to be in a working state based on the first relative positional relationship

FIG. 5

DISPLAY CONTROL METHOD AND ELECTRONIC DEVICE

CROSS-REFERENCES TO RELATED APPLICATION

This application claims priority to Chinese Patent Application No. 202211734692.3 filed on Dec. 31, 2022, the entire content of which is incorporated herein by reference.

FIELD OF TECHNOLOGY

The present disclosure relates to the field of information processing technology and, more specifically, to a display control method and an electronic device.

BACKGROUND

With the continuous development of electronic devices, electronic devices with dual screens will inevitably become a trend in the future. For example, laptops with dual screens, etc. However, the use of electronic devices with dual screens is relatively fixed and is not flexible.

SUMMARY

One aspect of this disclosure provides a display control method. The display control method includes determining a first relative positional relationship between a first surface and/or a second surface of the first body of an electronic device and a first surface of a second body of the electronic device. The first relative positional relationship is related to at least one of a first rotation and a second rotation of the first body relative to the second body. A first display unit is disposed on the first surface of the first body, and a second display unit is disposed on the second surface of the first body. The first rotation and the second rotation belong to different types of spatial rotation. The method further includes controlling at least one of the first display unit and the second display unit to be in a working state based on the first relative positional relationship.

Another aspect of this disclosure provides an electronic device. The electronic device includes a first body, a second body, and a control device. A first display unit is disposed on a first surface of the first body, and a second display unit is disposed on a second surface of the first body. The first surface and the second surface are mutually parallel planes of the first body. The first body is configured to perform a first rotation and a second rotation relative to the second body. The first rotation and the second rotation belong to different types of spatial rotation. The control device is configured to control at least one of the first display unit and the second display unit to be in a working state based on a first relative positional relationship between the first surface and/or the second surface of the first body and a first surface of the second body.

BRIEF DESCRIPTION OF THE DRAWINGS

In order to illustrate the technical solutions in accordance with the embodiments of the present disclosure more clearly, the accompanying drawings to be used for describing the embodiments are introduced briefly in the following. It is apparent that the accompanying drawings in the following description are only some embodiments of the present disclosure. Persons of ordinary skill in the art can obtain other accompanying drawings in accordance with the accompanying drawings without any creative efforts.

FIG. 4 is a schematic structural diagram of the electronic device according to an embodiment of the present disclosure.

FIG. 5 is a flowchart of a display control method according to an embodiment of the present disclosure.

DETAILED DESCRIPTION

Technical solutions of the present disclosure will be described in detail with reference to the drawings. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

For ease of understanding, the electronic device applicable to the technical solution of the present disclosure will be described first.

Figure 1:
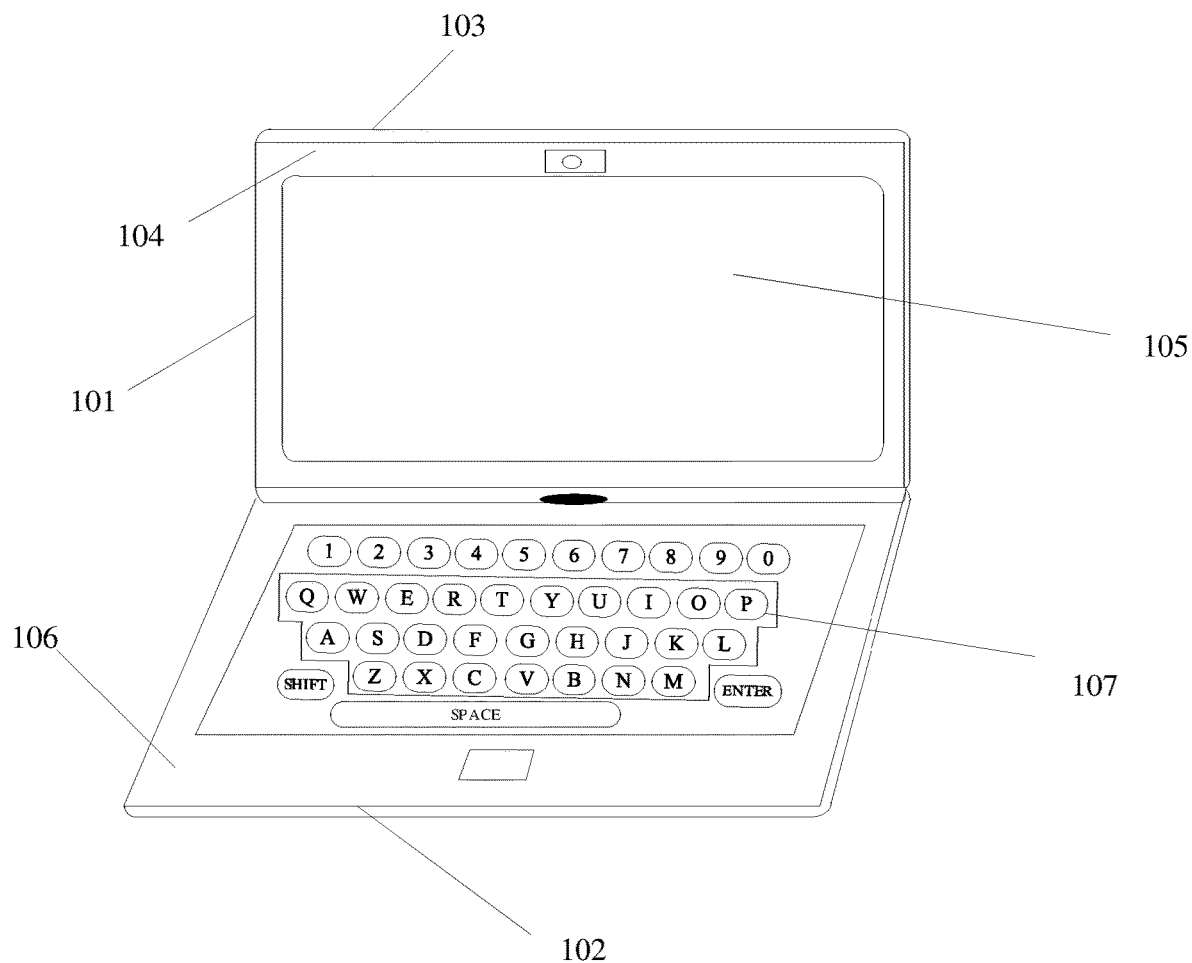
FIG. 1 is a schematic structural diagram of an electronic device according to an embodiment of the present disclosure.

FIG. 1 is a schematic structural diagram of an electronic device according to an embodiment of the present disclosure.

As shown in FIG. 1, the electronic device includes a first body 101 and a second body 102. A first surface 103 of the first body 101 is provided with a first display unit (not shown in FIG. 1), and a second surface 104 of the first body is provided with a second display unit 105. The first surface and the second surface are two mutually parallel planes of the first body. As shown in FIG. 1, the first surface and second surface of the first body are respectively back and front surfaces of the first body.

In the present disclosure, the first body may rotate relative to the second body, The rotation may include a first rotation and a second rotation. The first rotation and the second rotation may be different types of spatial rotation.

The relative positional relationship between the first body and the second body may be changed through the first rotation, and the rotation of the first surface and the second surface of the first body relative to the first surface of the second body may be changed through the second rotation. Therefore, the relative positional relationship of the first surface and/or the second surface of the first body relative to the second body can be changed based on at least one of the first rotation and the second rotation.

The second body may also have a first surface and a second surface, and the first surface and the second surface of the second body may be two parallel and opposite surfaces of the second body.

In some embodiments, an interactive device may be provided on a first surface 106 of the second body 102, and the interactive device may be used to realize human-computer interaction. In FIG. 1, the interactive device includes keyboard 107 as an example. In some embodiments, the interactive device may also include a keyboard and a touch panel. The interactive device may also be an interactive device that supports touch input and display functions. For example, the interactive device may be a display device that supports touch input and display. As an interactive device, the display device may support multiple functions such as a handwriting pad and a drawing pad. Of course, the interactive device may also have other functions, which are not limited in the embodiments of the present disclosure.

The second surface of the second body may be the back of the second body.

In some embodiments, the first rotation may be a rotation of the first body around the first axis. The first axis may be parallel to the first side of the first body. The first side may be the side where the first body and the second body are connected. For example, the first side may be the side of the first body where a connector for connecting the second body is located.

By rotating the first body around the first axis, the first body can rotate around the second body, causing the angle between the first body and the second body to change.

Refer to FIG. 1. The first axial direction may be an axial direction parallel to the lower side of the first body. The rotation of the first body about the first axis substantially changes the angle between the first body and the second body.

Based on FIG. 1, as the first body rotates around the first axis, the angle between the first body 101 and the second body 102 can increase or decrease.

Figure 2:
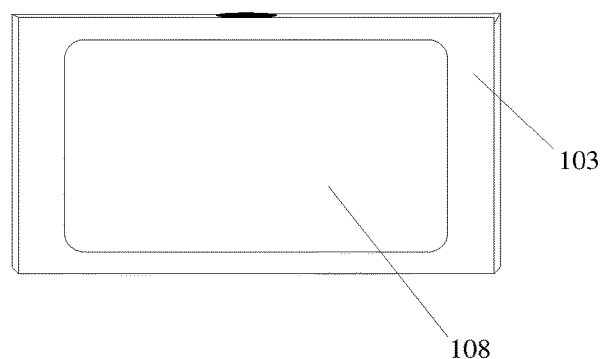
FIG. 2 is a schematic structural diagram of the electronic device according to an embodiment of the present disclosure.

For example, in the electronic device shown in FIG. 1, the second surface of the first body can be made to fit to the first surface of the second body by rotating the first body around the first axis, as shown in FIG. 2.

In FIG. 2, the second surface of the first body 101 is in contact with the first surface of the second body. In this case, the first surface 103 of the first body 101 is on the top surface. In this case, the user can view the first display unit 108 provided on the first surface 103 of the first body 101, but the second display unit is invisible.

In the present disclosure, the second rotation may be a rotation of the first body around a second axis. The second axial direction may be perpendicular to the first axial direction, and the second axial direction may be parallel to the first plane where the first body is located (of course, it may also be parallel to a second plane or the first body). Through the second rotation of the first body about the second axis, the first surface or the second surface of the electronic device can be made to face the first surface of the second body.

The second rotation of the first body around about the second axis can be regarded as a rotation operation of flipping the first surface and the second surface of the first body.

Figure 3:
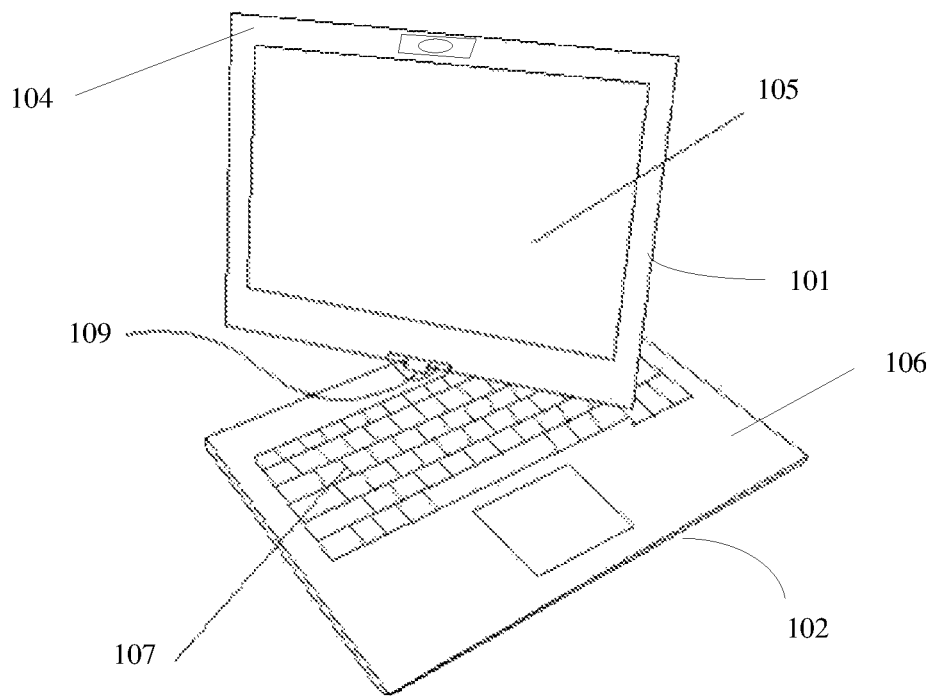
FIG. 3 is a schematic structural diagram of the electronic device according to an embodiment of the present disclosure.

The following described a device form of the electronic device shown in FIG. 3.

In FIG. 3, by rotating the first body 101 around the second axis, the bottom side of the first body 101 (i.e., the first side described above) and the side of the second body where a connector 109 is provided are transformed from a parallel state to having a certain angle. In this way, the second surface 104 of the first body 101 no longer faces the first surface 106 of the second body 102.

Based on FIG. 3, by continuing to rotate the first body around the second axis, the first surface of the first body can be rotated to a state facing the first surface of the second body, as shown in FIG. 4.

FIG. 4 shows a state of the electronic device after the first body is rotated around the second axis. FIG. 4 can be viewed as a rear view of the electronic device after the first body is rotated around the second axis based on FIG. 1. In FIG. 4, the second surface 104 of the first body 101 faces away from the first surface 106 of the second body 102, while the first surface of the first body 101 faces the first surface 106 of the second body 102.

In the present disclosure the first display unit and the second display unit may be different types of display units.

In some embodiments, both the first display unit and the second display unit may support display of at least three colors, and the at least three colors may include black, white, and at least one color other than black and white.

In some embodiments, an image presented by the first display unit may be perceived by the viewer after being illuminated by light. That is, the image presented by the first display unit can rely on light reflection external to the electronic device to enter the viewer's eyes, instead of relying on the first display unit to emit light to project image into the human eyes.

Therefore, there is no need to provide a light-emitting unit such as a backlight component for the first display unit, which can reduce the power consumption required to display images and reduce power consumption. In addition, since the image presented by the first display unit is reflected rather than directly projected into the human eyes, eye damage to the user viewing the first display unit can be reduced.

In some embodiments, display sizes of the first display unit and the second display unit may satisfy the same condition. The display sizes satisfy the same condition may be that the display sizes between the first display unit and the second display unit is less than a set threshold. For example, relative to the display size of the first display unit, the size difference between the display size of the second display unit and the display size of the first display unit may not exceed 20% of the display size of the first display unit.

In particular, when the display sizes of the first display unit and the second display unit satisfy the same condition, the power consumption of the first display unit may be lower than the power consumption of the second display unit.

In some embodiments, the power consumption of the first display unit being lower than the power consumption of the second display unit may be that the refresh rate of the first display unit is lower than the refresh rate of the second display unit.

In some embodiments, the first display unit may have a plurality of color-forming units encapsulated with different charged particles, and the first display unit may present at least three colors. The second display unit may be different from the first display unit, and the power consumption of the first display unit may be lower than the power consumption of the second display unit.

For example, the first display unit may be a color ink screen, and the second display unit may be a liquid crystal display screen or an organic light-emitting diode (OLED) screen. In some embodiments, the liquid crystal display screen may be a liquid crystal display (LCD), which is not limited in the embodiments of the present disclosure. It can be understood that the color ink screen uses external light to reflect the image it presents into the human eyes, and the refresh rate is relatively low, thereby making the power consumption of the color ink screen much lower than the power consumption of an OLED screen or an LCD screen.

In the present disclosure, the electronic device may also include a control device (not shown in FIG. 1 to FIG. 4). The control device may be directly or indirectly connected to the first display unit and the second display unit. For example, the control device may be connected to the first display unit through a first display control unit connected to the first display unit, and the control device may be connected to a second display control unit connected to the second display unit, such that the control device can be indirectly connected to the second display unit.

There are many possible states for the control device, which is not limited in the embodiments of the present disclosure. In some embodiments, the control device may be an embedded controller (EC).

In the present disclosure, the control device can be used to control at least one of the first display unit and the second display unit to be in a working state based on a first relative positional relationship between the first surface and/or the second surface of the first body and the first surface of the second body.

Based on the above description, the display control method of the present disclosure will be described in detail below.

FIG. 5 is a flowchart of a display control method according to an embodiment of the present disclosure. The display control method can be applied to the electronic device described above. The display control method will be described in detail below.

501, determining a first relative positional relationship between the first surface and/or the second surface of the first body of the electronic device and the first surface of the second body of the electronic device.

The first relative positional relationship may be related to at least one of a first rotation and a second rotation of the first body relative to the second body.

In some embodiments, the first relative positional relationship may reflect the relative positional relationship between the two surfaces of the first body and the first surface of the second body. For example, the first relative positional relationship may at least represent the orientation relationship between the first surface and the second surface of the first body and the first surface of the second body. In addition, the first relative positional relationship may also represent the fit between the first surface or the second surface of the first body and the first surface of the second body. For example, the first relative positional relationship may be that the second surface of the first body is in contact with the first surface of the second body, which suggests that the second surface of the first body faces the first surface of the second body and is in contact with the first surface of the second body.

In some embodiments, the fit between the first surface and the second surface of the first body and the first surface of the second body may be determined by the angle between at least one of the first surface and the second surface of the first body and the first surface of the second body, or determined by a sensing value of a specific sensor, which is not limited in the embodiments of the present disclosure.

502, controlling at least one of the first display unit and the second display unit to be in a working state based on the first relative positional relationship.

In some embodiments, the display unit being in a working state may suggest that the display unit is turned on and lit, and can output display content.

It should be understood that the first relative positional relationship can reflect the relative positional relationship between at least one of the first surface and the second surface of the first body and the first surface of the second body. Since the first surface and the second surface of the first surface may be provided with different display units, when the first relative positional relationship is different, the display units that can be used or suitable for use by the user may also be different. Based on this, combined with the first relative positional relationship, the working state of the first display unit and the second display unit can be more reasonably controlled, and the user can use the electronic device more conveniently.

In the present disclosure, the first body of the electronic device may perform two different spatial rotations relative to the second body such that the relative positional relationship between the first surface and the second surface of the first body and the first surface of the second body on which the keyboard is provided can change. Based on this, the electronic device can flexibly control the display of the two display units on the first body based on the relative positional relationship, thereby improving the diversity and flexibility of the user of the electronic device.

In some embodiments, in order to more intuitively reflect the display unit suitable for work based on the first relative positional relationship, the display control method may also determine the mode in which the electronic device is in based on the first relative positional relationship. In this way, based on the mode in which the electronic device is in, at least one of the first display units and the second display unit can be controlled to be in a working state.

In some embodiments, the mode the electronic device is in may be related to the first relative positional relationship. When the first relative positional relationship is different, the mode the electronic device is in may also be different.

The mode in which the electronic device is in may be understood as the operating mode in which the electronic device is available to the user, or an operating form in which the electronic device is in.

It should be understood that when the first relative positional relationship between the first surface and the second surface of the first body and the first surface of the second body is different, the state of the electronic device may also be different. In addition, since both the first surface and the second surface of the first body of the electronic device can be provided with display units, when the first relative positional relationship is different, the display units that the electronic device is suitable for or can operate may also be different, thereby resulting in different modes of the electronic device.

It can be understood that when the electronic device is in different modes, the relative positional relationship between the first surface and the second surface in the electronic device and the first surface of the second body may be different. Therefore, whether the first display unit and the second display unit can be used or whether they are suitable for use may also be different. Based on this, in the present disclosure, the operation of one or both of the first display unit and the second display unit may be reasonably controlled in combination with the mode in which the electronic device is in.

In some embodiments, based on the first relative positional relationship, whether the first surface and the second surface of the first body are in contact with the first surface of the second body can be determined. Correspondingly, the electronic device can have two modes.

More specifically, if the first relative positional relationship indicates that the second surface of the first body is in contact with the first surface of the second body, the electronic device can be determined to be in a first mode. If the first relative positional relationship indicates that the first surface of the first body is in contact with the first surface of the second body, the electronic device can be determined to be in a second mode.

When the electronic device is in the first mode, since the second surface of the first body is contact with the first surface of the second body, the second relative positional relationship disposed on the second surface of the first body cannot be seen by the user. Therefore, the second display unit is not suitable for outputting display content or is not suitable for the user to use.

The following example will be described in detail in conjunction with FIG. 1 and FIG. 2.

Based on FIG. 1, if the first body 101 is rotated around the second body in a direction toward the second body 102, the second surface 104 of the first body 101 will rotate toward the first surface 106 of the second body 102. In this way, the second surface 104 of the first body 101 will ultimately be in contact with the first surface 106 of the second body 102, thereby switching the electronic device from the state shown in FIG. 1 to the state shown in FIG. 2.

It can be seen from FIG. 2 that the second display unit on the second surface of the first body is in contact with the second body, making the second display unit invisible and unsuitable for presenting display content to the user. The first display unit 108 on the first surface 103 of the first body is the top surface and in a visible state, which is suitable for presenting display content to the user.

Correspondingly, when the electronic device is in the first mode, the electronic device may control the first display unit to be in a working state, and control the second display unit to be in a non-working state.

Similarly, when the electronic device is in the second mode, since the first surface of the first body is in contact with the first surface of the second body, the first display unit located on the first surface of the first body is in an invisible state and is not suitable for present display content to the user, while the second display unit on the second surface of the second body is in a visible state and is suitable for present display content to the user.

The following example will be described in detail in conjunction with FIG. 1 and FIG. 3.

In the state of the electronic device shown in FIG. 1, in the manner shown in FIG. 3, the first body can be rotated for a second time along the second axis such that the first surface of the first body is rotated from facing away from the first surface of the second body to facing the first surface of the second body. Subsequently, the first body can be rotated for the first time along the first axis to close the first body such that the first surface of the first body is in contact with the second body. The difference between FIG. 3 and FIG. 2 is that in this case, the second surface of the first body is on the top surface and in a visible state, while the first surface of the first body is in an invisible state.

It can be seen that in order to be suitable for user to user, when the electronic device is in the second mode, the second display unit of the electronic device can be controlled to be in a working state, and the first display unit can be controlled to be in a non-working state.

In some embodiments, the display units being in a non-working state may be that the display units are in a state in which the display units are unable to output display content, such as the standby state, the screen off state, or a state in which the startup of the display units are being terminated.

In the embodiments of the present disclosure, the first body of the electronic device can perform two different spatial rotations relative to the second body such that the relative positional relationship between the first surface and the second surface of the first body and the first surface of the second body on which the keyboard is located can change. The relative positional relationship can affect the mode in which the relative positional relationship is in such that the mode in which the electronic device is in can be flexibly adjusted through two different spatial rotations. Based on this, the electronic device can flexibly control the display of the two display units on the first body based on the mode the electronic device corresponding to the relative positional relationship, thereby improving the diversity and flexibility of the user mode of the electronic device.

It should be understood that on the premise that the first body of the electronic device can perform the first rotation and the second rotation relative to the second body, in addition to changing the relative positional relationship between the first surface and the second surface of the first body in the electronic device relative to the second body, the relative positional relationship between the first body and the second body of the electronic device may also be changed through the first rotation and the second rotation.

Based on this, in the present disclosure, while determining the first relative positional relationship, the relative positional relationship between the first body and the second body can also be determined. For ease of distinction, the relative positional relationship between the first body and the second body may be referred to the second relative positional relationship.

The second relative positional relationship between the first body and the second body reflects the relative positional relationship between the first body and the second body, which does not involve the relationship between different planes of the first body and the second body. Correspondingly, the second relative positional relationship will be related to the first rotation of the first body relative to the second body in the electronic device. Of course, the second relative positional relationship may be related to the second rotation. For example, the second relative positional relationship may be related to the first rotation, or to the first rotation and the second rotation.

For example, the second relative positional relationship may at least represent the angle relationship between the first body and the second body. Based on this, through the first rotation of the first body around the second body, the second relative positional relationship between the first body and the second body can be changed, and the angle between the first body and the second body can also be reflected through the second relative positional relationship.

Based on this, in the present disclosure, at least one of the first display unit and the second display unit may also be controlled to be in a working state based on the first relative positional relationship and the second electronic device.

For example, combining the first relative positional relationship and the second relative positional relationship, a target display unit suitable for use under the current attitude of the electronic device can be determined, the target display unit may be at least one of the first display unit and the second display unit. Correspondingly, the target display unit may be controlled to be in a working state.

In some embodiments, the mode in which the electronic device is in may be determined first based on the first relative positional relationship and the second relative positional relationship. Subsequently, based on the mode in which the electronic device is in, at least one of the first display unit and the second display unit can be controlled to be in a working state.

Based on the foregoing description, it can be seen that changes in the relative positional relationship between the first body and the second body can also cause changes in the operating mode of the electronic device, causing the electronic device to have other modes.

In this case, the mode in which the electronic device is in may include the first mode and the second mode described above. In addition, the electronic device may also include a third mode and a fourth mode.

Figure 6:
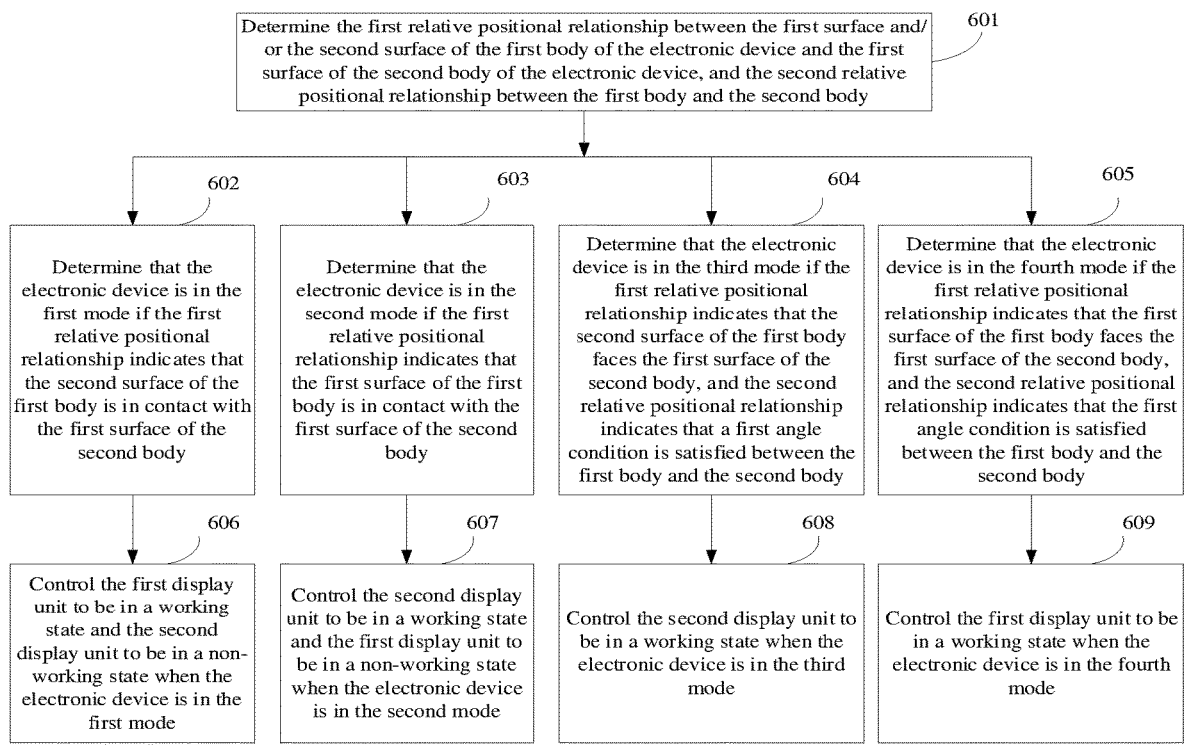
FIG. 6 is a flowchart of the display control method according to an embodiment of the present disclosure.

FIG. 6 is a flowchart of the display control method according to an embodiment of the present disclosure. The method will be described in detail below.

601, determining the first relative positional relationship between the first surface and/or the second surface of the first body of the electronic device and the first surface of the second body of the electronic device, and the second relative positional relationship between the first body and the second body.

For details of the first relative positional relationship, reference can be made to the relevant description provided above, which will not be repeated here.

The second relative positional relationship may at least represent the angular relationship between the first body and the second body.

602, determining that the electronic device is in the first mode if the first relative positional relationship indicates that the second surface of the first body is in contact with the first surface of the second body.

603, determining that the electronic device is in the second mode if the first relative positional relationship indicates that the first surface of the first body is in contact with the first surface of the second body.

For details of the first mode and the second mode, reference can be made to the relevant description provided above, which will not be repeated here.

It should be understood that when the electronic device is in the first mode or the second mode, the first surface or the second surface of the first body may be in contact with the first surface of the second body. Therefore, the relative positional relationship between the first body and the second body can be determined. For example, the angle between the first body and the second body may be 0°. Based on this, in the present disclosure, whether the electronic device is in the first mode, or the second mode can be determined solely based on the first relative positional relationship.

Of course, in order to more reliably determine the first mode and the second mode, the first relative positional relationship and the second relative positional relationship can also be combined to comprehensively determine whether the electronic device is in the first mode or the second mode. For example, the first relative positional relationship indicates that the second surface of the first body is in contact with the first surface of the second body, and the second relative positional relationship indicates that the angle between the first body and the second body is between 0° to 10°, then the electronic device can be determined to be in the first mode. The second mode can be determined in a similar manner, which will not be repeated here.

604, determining that the electronic device is in the third mode if the first relative positional relationship indicates that the second surface of the first body faces the first surface of the second body, and the second relative positional relationship indicates that a first angle condition is satisfied between the first body and the second body.

Considering that the angle between the first body and the second body may be different, the second surface of the first body facing the first surface of the second body may not necessarily be the second surface of the first body is facing the first surface of the second body. As long as the second surface of the first body is on the side of the first surface of the second body (in this case, the first surface of the first body is the first surface facing away from the second body), the second surface of the first body can be considered as facing the first surface of the second body.

In some embodiments, the first angle condition may be set as needed.

For example, the first angle condition may be the angle condition that is suitable for viewing the second display unit on the second surface of the first body when the user's hand or arm is in contact with or substantially parallel to the first surface of the second body, such as when the user operates an interactive device (e.g., a keyboard).

In some embodiments, the first angle condition may be that the angle between the first body and the second body is within a first angle range, and the first angle range may be greater than a first angle and less than a second angle. Since the second surface of the first body faces the first surface of the second body, the angle between the first body and the second body can also be regarded as the angle between the second surface of the first body and the first surface of the second body. For example, the angle between the first body and the second body may be between 75° to 135°.

Refer to FIG. 1. In FIG. 1, the second surface 104 of the first body 101 faces the second display unit 105 of the second body 102 on which keyboard 107 is disposed. Based on this, the angle between the first body and the second body also satisfies the first angle condition. Therefore, the state of the electronic device shown in FIG. 1 is also the state of the electronic device in the third mode.

605, determining that the electronic device is in the fourth mode if the first relative positional relationship indicates that the first surface of the first body faces the first surface of the second body, and the second relative positional relationship indicates that the first angle condition is satisfied between the first body and the second body.

In some embodiments, as long as the first surface of the first body is on the side of the first surface of the second body (in this case, the second surface of the first body is facing away from the second surface of the second body), the first surface of the first body can be considered as facing the first surface of the second body.

When the electronic device is in the fourth mode, the first surface of the first may face the second surface of the second body, and the first angle condition that needs to be satisfied between the first body and the second body may be consistent with the first angle condition that needs to be satisfied in the third mode. Alternatively, inconsistent angle conditions may also be set as needed.

Refer to FIG. 1. In the state of the electronic device shown in FIG. 1, the first body can be rotated around the second axis such that the first surface and the second surface of the first body are flipped over each other, such that the first surface of the first body is facing the first surface of second body, causing the electronic device to be in a state corresponding to the fourth mode.

606, controlling the first display unit to be in a working state and the second display unit to be in a non-working state when the electronic device is in the first mode.

607, controlling the second display unit to be in a working state and the first display unit to be in a non-working state when the electronic device is in the second mode.

For details of the processes at 606 and 607, reference can be made to the relevant descriptions provided above, which will not be repeated here.

608, controlling the second display unit to be in a working state when the electronic device is in the third mode.

It should be understood that when the electronic device is in the third mode, the second display unit on the second surface of the first body may face the first surface of the second body. Therefore, if an interactive device such as a keyboard is provided on the first surface of the second body, the user can view the content of the second display unit while operating the interactive device such as the keyboard. For example, as can be seen from FIG. 1, in the third mode, the user can operate the keyboard on the second body and at the same time view the second display unit 105 on the first body 101.

Based on this, when the electronic device in the third mode, in order for the user to conveniently perform operation and view the displayed content, the second display unit facing the keyboard side of the second body can be controlled to be in a working state.

It should be understood that when the electronic device is in the third mode, the first display unit on the first surface of the first body may be controlled to be in a non-working state.

In some embodiments, considering that the power consumption of the first display unit is relatively low, the first display unit may also be controlled to display a fixed background image. For example, the first display unit may be a color ink screen, and the color ink screen will only be refreshed when new display content needs to be presented. Therefore, using the color ink screen to display a fixed background image will not increase the power consumption of the first display unit, and when switching to other modes that require the color ink screen to output display content, there is no need to restart the color ink screen such that the corresponding content can be quickly presented.

Of course, considering that in some cases, the user may need to view different display contents on both sides of the first surface and the second surface of the first body, therefore, when the electronic device is in the third mode, while the electronic device may control the second display unit to be in a working state, the electronic device may also control the first display unit to be in a normal working state.

609, controlling the first display unit to be in a working state when the electronic device is in the fourth mode.

Similar to the third mode, when the electronic device is in the fourth mode, since the first surface of the first body faces the keyboard side of the second body, and the first angle condition is satisfied between the first body and the second body, the user may view the second display unit on the first surface of the first body while operating the keyboard. Based on this, in order to facilitate the user to use the electronic device, in the present disclosure, the first display unit may be controlled to be in a working state.

Similarly, in the fourth mode, while the first display unit may be controlled to be in a working state, the second display unit may be controlled to present a specified background image, such as a background image including data and time, or the second display unit may be controlled to be in a normal working state.

Consistent with the present disclosure, since the first body can perform the first rotation and the second rotation relative to the second body, the first surface and the second surface of the first body can have different first relative positional relationships with respect to the first surface of the second body with the keyboard, and the first body and the second body can have different second relative positional relationships such that the electronic device can have multiple modes. Based on this, in the present disclosure, the working state of the first display unit or the second display unit can be more reasonably controlled in combination with the mode of the electronic device. In this way, the display of the display unit can be reasonably controlled in different modes, which is beneficial to the user's use of the electronic device, thereby improving the flexibility of display control of the electronic device in different modes.

It should be understood that in some embodiments, if the first surface or the second surface of the first body is not in contact with the second body, and the first angle condition between the first body and the second body is not satisfied, it may indicate that the electronic device is currently not suitable for viewing the display unit on the first body facing the first surface of the second body while operating the keyboard and other interactive devices in the second body. However, since both the first surface and the second surface of the first body have display units, when the first body and the second body do not satisfy the first angle condition, the user may also view the display unit on the first surface of the first body facing away from the second body. Based on this, user may also have a need to view the display content output by a display unit on the electronic device without using an interactive device such as a keyboard.

Correspondingly, in some embodiments, based on the first relative positional relationship and the second relative positional relationship, the electronic device may be determined to be in a fifth mode and a sixth mode.

In some embodiments, if the first relative positional relationship indicates that the second surface of the first body faces the first surface of the second body, and the second relative positional relationship indicates that the first body and the second body satisfy a second angle condition, the electronic device may be determined to be in the fifth mode.

In some embodiments, the second angle condition may be different from the first angle condition described above.

In some embodiments, the second angle condition may indicate an angle that the first body and the second body need to satisfy when the first surface or the second surface of the first body faces the first surface of the second body and the first surface of the second body is not suitable for operations (such as operating a keyboard, etc.).

In some embodiments, the second angle condition may be that the angle between the first body and the second body is within a second angle range. For example, the second angle range may be from 10° to 75°.

Since in the fifth mode, the second surface of the first body faces the first surface of the second body, and the second angle condition is satisfied between the first body and the second body, it may be inconvenient for the user to operate on the first surface of the second body and view the second display unit on the second surface of the first body. For example, viewing the second display unit while operating the keyboard on the first surface of the second body.

Based on this, in order to flexibility control the display of the two display units on the electronic device and conform to the user's operating habits, when the electronic device is in the fifth mode, the first display unit may be controlled to be in a working state, and the second display unit may be controlled to be in a non-working state.

Similarly, if the first relative positional relationship indicates that eh first surface of the first body faces the first surface of the second body, and the second relative positional relationship indicates that the first body and the second body satisfy the second angle condition, the electronic device may be determined to be in the sixth mode.

The second angle condition between the first body and the second body being satisfied may be consistent as described above. For example, the angle between the first body and the second body may be in a second angle range, such as 10°-75°, or the second angle condition may be set to be different from the fifth mode, such as 20°-75°.

When the electronic device is in the sixth mode, since the first surface of the first body faces the first surface of the second body, and the second angle condition is satisfied between the first body and the second body, it may indicate that the angle between the first body and the second body is relatively small, and it is currently not suitable for operating on the first surface of the second body (e.g., operating a keyboard) and viewing the first display unit on the first surface of the first body. Based on this, when the electronic device is in the sixth mode, the second display unit may be controlled to be in a working state, and the first display unit may be controlled to be in a non-working state.

For ease of understanding, the state of the electronic device when the electronic device is in the sixth mode will be taken as an example and described below.

FIG. 4 shows a schematic diagram of the electronic device in the sixth mode.

Comparing FIG. 4 and FIG. 1, it can be seen that based on FIG. 1, the second rotation of the first body is performed along the second axis to flip the first surface and the second surface of the first body such that the first surface of the first body faces the first surface of the second body, and the second surface of the first body faces away from the second surface. Subsequently, the first body is rotated along the first axis such that the angle between the first body and the second body decreases, thereby obtaining the state of the electronic device shown in FIG. 4.

It can be seen from FIG. 4 that since the first surface of the first body 101 faces the first surface 106 of the second body 102 where the keyboard is board and the angle between the first body 101 and the second body 102 is relatively small, therefore, it is not easy for the user to clearly see the first display unit on the first surface of the first body. At the same time, the second surface 104 of the first body 101 faces away from the first surface 106 of the second body 102, such that the second display unit 105 on the second surface 104 of the first body 101 can facilitate the user to view or perform input operations.

Therefore, when the electronic device is in the fourth mode, it is similar to a tablet computer being supported by a support member, and the display unit that the user actually wants to operate is the second display unit on the second surface of the first body. Based on this, the electronic device may control the second display unit to be in a working state, thereby enabling the user to view or operate the second display unit.

In addition, when the electronic device is in the fifth mode or the sixth mode, the user may also turn the electronic device upside down such that the electronic device can be in tent mode.

In order to determine whether the electronic device enters the tent mode in the fifth mode or the sixth mode, in the present disclosure, a third relative positional relationship between the first side of the first body and the second side of the first body may be determined at the same time or after determining whether the electronic device is in the fifth mode or the sixth mode.

In some embodiments, the first side may be the side where the first body and the second body are connected, that is, the side where the connector is provided on the first body. The connector may be a component used to connect the first body and the second body. As shown in FIG. 4, the first side is the side of the first body to which connector 109 is connected, that is, the first side 110 shown in FIG. 4. The second side of the first body is parallel to the first side of the first body.

In some embodiments, the third relative positional relationship between the first side and the second side of the first body may at least indicate the top-bottom positional relationship between the first side and the second side of the first body.

Correspondingly, when the electronic device is in the fifth mode, if the third relative positional relationship indicates that the first side is located above the second side, then after controlling the first display unit to be in the working mode, a display screen presentation mode of the first display unit may also be adjusted.

In some embodiments, the display screen presentation mode of the display unit may be the presentation mode in which the display unit presents the display content. For example, the display screen presentation mode may include a first direction presentation mode and a second direction presentation mode. The first direction presentation mode and the second direction presentation mode may refer to the different direction in which the display unit loads the display content.

In the present disclosure, by adjusting the display screen presentation mode of the display unit, the display content presented by the display unit may be made more convenient for the user to view.

It should be understood that if the electronic device is in the fifth mode and the first side of the first body is located above the second side, in order for the user to conveniently view the display content present by the first display unit on the first surface of the first body, the display screen presentation mode of the first display unit may be switched from the first direction presentation mode from the second side to the first side to the second direction presentation mode from the first side to the second side.

It should be understood that if the electronic device is in the fifth mode and the user does not flip the electronic device such that the electronic device is in the tent mode, the first side of the first body of the electronic device will be located below the second side. Subsequently, the display content can be displayed to the first display unit based on the first direction presentation mode from the second side to the first side, and what the user sees from the first display unit is a forward display screen.

However, if the electronic device is in the fifth mode, and the user flips the electronic device such that the electronic device is in the tent mode while the electronic device is in the fifth mode, since the first side of the first body is located above the second side, if the presentation mode of the first display unit is not adjusted at this time, the display screen in the first display unit seen by the user will be an inverted screen. Therefore, the display screen presentation mode of the first display unit can be adjusted for the user to see the forward display screen on the first display unit.

Similarly, when the electronic device is in the sixth mode, if the third relative positional relationship indicates that the first side of the first body is above the second side of the first body, after controlling the second display unit to be in the working state, the display screen presentation mode of the second display unit may also be adjusted.

When the electronic device is in the sixth mode and the third relative positional relationship indicates that the first side of the first body is above the second side, it may indicate that the user has flipped the electronic device such that the electronic device is in the tent mode corresponding to the sixth. Based on this, in order to allow the second display unit to display a forward-facing image, it is necessary to adjust the presentation mode of the second display unit.

An example will be described below in conjunction with FIG. 4 and FIG. 7.

FIG. 4 is a schematic diagram of the electronic device in the sixth mode. Based on FIG. 4, the electronic device is flipped over to flip the first side 110 of the first body 101 of the electronic device from bottom to top such that the electronic device presents a tent mode to obtain the state of the electronic device shown in FIG. 7.

Comparing FIG. 4 and FIG. 7, it can be seen that in FIG. 4, the first side 110 of the first body 101 is located below a second side 111. In this case, if the second display unit 105 displays the display screen in the direction from the second side to the first side, then the user will see a forward display screen.

Figure 7:
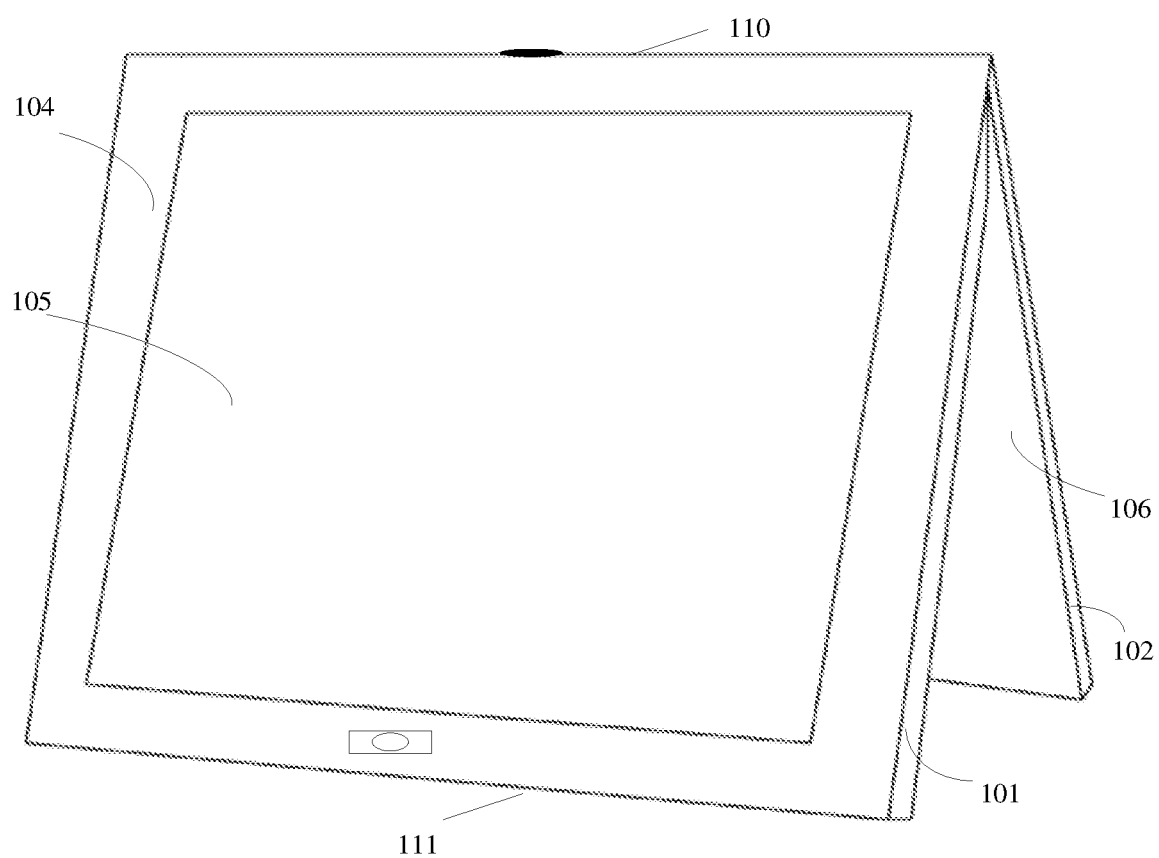
FIG. 7 is a schematic structural diagram of the electronic device according to an embodiment of the present disclosure.

In the tent mode shown in FIG. 7, the first side 110 of the first body 101 is located above the second side 111. In this case, if the first display unit still displays the display image in the direction from the second side to the first side, what the user sees will be an inverted image. Therefore, in the tent mode shown in FIG. 7, there is a need to adjust the display screen presentation mode of the first display unit 108. In this way, the first display unit can display the display screen in the direction from the first side to the second side such that the user can see the forward display screen.

When the electronic device is in the fifth mode or the sixth mode, the user may also turn the electronic device upside down such that the electronic device is in the tent mode corresponding to the fifth mode or the tent mode corresponding to the sixth mode. When in tent mode, both the first display unit and the second display unit may be in a working state, allowing the user to view.

There are many possible methods for determining the first relative positional relationship between at least one of the first surface and the second surface of the first body and the first surface of the second body, which is not limited in the embodiments of the present disclosure.

For ease of understanding, an example is provided below.

In the present disclosure, the electronic device may be provided with a plurality of first sensors connected to the control device.

Based on this, the control device of the electronic device may determine the first relative positional relationship based on the sensing values of the plurality of first sensor.

In some embodiments, the sensing values of the plurality of first sensor may be used to characterize the first relative positional relationship between at least one of the first surface and the second surface of the first body and the first surface of the second body. For example, the electronic device may determine the first relative positional relationship corresponding to the current sensing values of the plurality of first sensors based on the corresponding relationship between different combinations of respective sensing values of the plurality of first sensors and various configured relative positional relationships.

In some embodiments, the electronic device may also be provided with one or more sensing components, and the first sensor may be used to sense the sensing component to obtain a sensing value.

In some embodiments, the sensing value sensed by at least one of the plurality of first sensors may be changed based on at least one of the first rotation and the second rotation of the first body relative to the second body.

Similarly, there are many possible methods for determining the second relative positional relationship between the first body and the second body, which is not limited in the embodiments of the present disclosure.

For example, an angle sensor may be provided for sensing the angle between the first body and the second body, and the angle sensor may be used to sense the second relative positional relationship between the first body and the second body.

In another example, a plurality of second sensors may be provided on the electronic device, and the plurality of second sensors may be connected to the control device. The sensing values of the plurality of second sensors may be used to represent the relative positional relationship between the first body and the second body. Correspondingly, the control device of the electronic device may determine the second relative positional relationship of the first body relative to the second body based on the sensing values of the plurality of second sensors, and the mode in which the electronic device is in may be determined based on the first relative positional relationship and the second relative positional relationship.

In some embodiments, the second sensor may be a gravity sensor or other types of sensors, which is not limited in the embodiments of the present disclosure.

For ease of understanding, an example is provided below. Take the first sensor as a Hall sensor, and there are sensing components respectively provided on the first body and the second body as an example.

Figure 8:
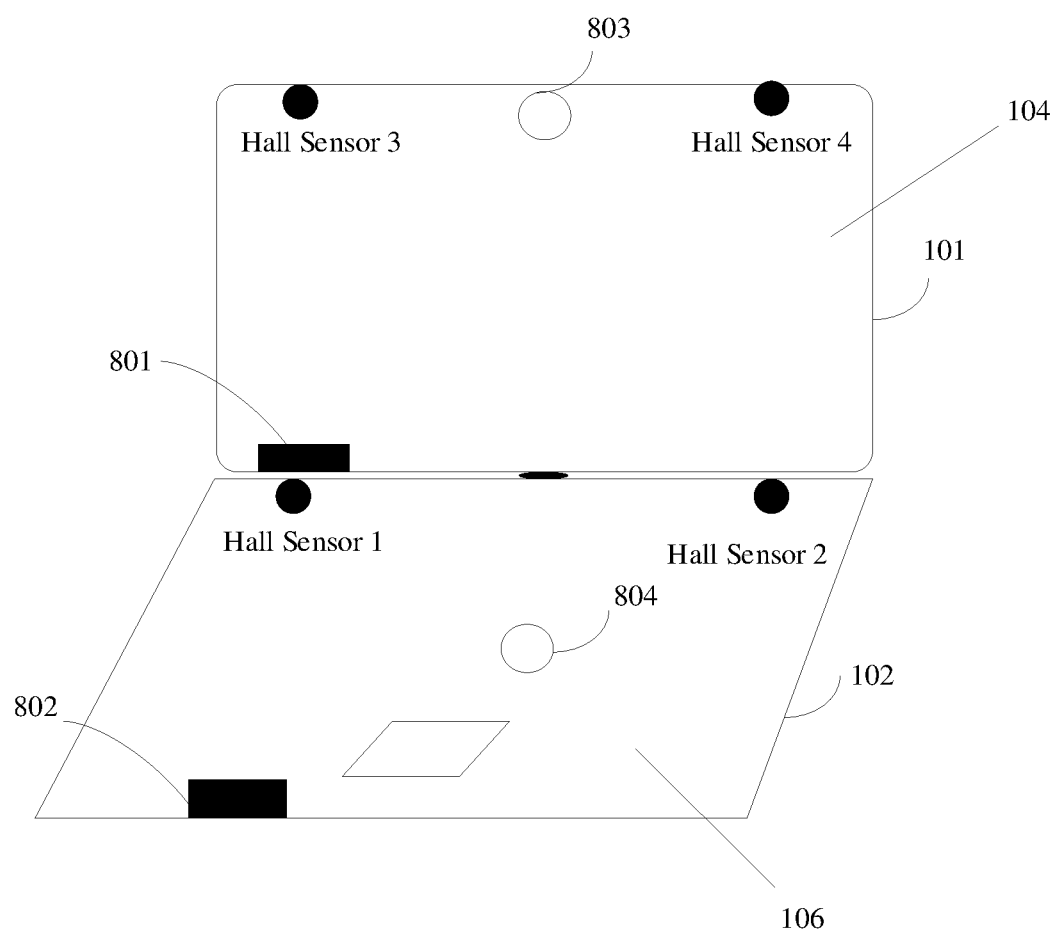
FIG. 8 is a schematic diagram of a distribution of sensors in the electronic device according to an embodiment of the present disclosure.

FIG. 8 shows a schematic diagram of an electronic device provided with a plurality of first sensors and a plurality of sensing components.

In FIG. 8, a first sensing component 801 is provided on the first body 101 of the electronic device, and a second sensing component 802 is provided on the second body 102. For example, the first sensing component and the second sensing component may be magnets or other components that can be sensed by the Hall sensors.

As shown in FIG. 8, the first sensing component 801 is disposed on the first side of the first body 101, and the first side of the first body is the side where the connector of the first body to the second body is located. The second sensing component 802 is disposed on the first side of the second body 102. The first side of the second body is parallel to the second side of the second body, and the first side of the connector is disposed on the second side of the second body. A Hall sensor 1 and a Hall sensor 2 for sensing the first sensing component 801 are disposed at the second body 102. In addition, a Hall sensor 3 and a Hall sensor 4 for sensing the second sensing component 802 are disposed at the first body.

In the example of FIG. 8, the Hall sensor 1 and the Hall sensor 2 are disposed at different positions of the first side of the second body 102 (the lower side of the second body), and the Hall sensor 3 and the Hall sensor 4 are disposed at different positions of the second side of the first body (the upper side of the first body).

As shown in FIG. 8, when the second surface 104 of the first body 101 of the electronic device faces the first surface 106 of the second body 102, the Hall sensor 1 is opposite to the first sensing component 801 such that the Hall sensor 2 can sense the first sensing component 801. Since the Hall sensor 2 is relatively far from the first sensing component

801, the Hall sensor 2 cannot sense the first sensing component 801. Of course, the Hall sensor 3 and the Hall sensor 4 cannot sense the first sensing component 801.

Based on FIG. 8, if the first body of the electronic device performs a second rotation around the second axis (perpendicular to the first side of the first body and parallel to the axis of the first body), causing the first surface and the second surface of the first body to flip over, the first sensing component will also flip over against the first body, causing the second surface of the first body 101 to face the first surface 106 of the second body 102. In this case, the Hall sensor 2 is opposite to the first sensing component 801 such that the Hall sensor 2 can sense the first sensing component 801, but the Hall sensor 1, Hall sensor 3, and Hall sensor 4 cannot sense the first sensing component 801.

Based on FIG. 8, if the first body performs a first rotation around the first axis (the axis of the first side of the first body) such that the second surface 104 of the first body 101 is in contact with the first surface 106 of the second body 102, the Hall sensor 3 will be relatively close to the second sensing component 802. In this case, the Hall sensor 3 can sense the second sensing component 802, but the Hall sensor 4 cannot sense the second sensing component 802. At the same time, since the Hall sensor 1 and Hall sensor 2 and the second sensing component 802 are on the same body, the distance remains the same and is far away such that the Hall sensor 1 and the Hall sensor 2 cannot sense the second sensing component 802.

Based on FIG. 8, if the first body performs a second rotation around the second axis to flip the first surface and the second surface of the first body, the relative positions of the Hall sensor 3 and Hall sensor 4 relative to the second sensing component will also change. Based on this, if the first body is rotated around the first axis to close the first body, the first surface of the first body 101 can be in contact with the first surface 106 of the second body 102. In this case, the Hall sensor 4 is opposite and relatively close to the second sensing component 802 such that the Hall sensor 4 can sense the 802, but the Hall sensor 3 cannot sense the second sensing component 802. Correspondingly, the Hall sensor 1 and the Hall sensor 2 still cannot sense the second sensing component 802.

It can be seen from the above analysis that when the first relative positional relationship between at least one of the first surface and the second surface of the first body and the first surface of the second body changes, these Hall sensors can sense different sensing components such that the specific condition of the first relative positional relationship can be determined based on the sensing values sensed by these Hall sensors.

In addition, in FIG. 8, a first gravity sensor 803 is disposed on the first body 101 of the electronic device, and a second gravity sensor 804 is disposed on the second body 102.

In some embodiments, based on the angle of the first body relative to the direction of gravity sensed by the first gravity sensor and the angle of the second body relative to the direction of gravity sensed by the second gravity sensor, the relative positional relationship such as the angle between the first body and the second body can be calculated.

It can be seen from the above analysis that based on the sensing values of the Hall sensors and the gravity sensors, the mode in which the electronic device is in can be determined. The following table shows the specific sensing values of each sensor when the electronic device is in different modes.

| Mode | Hall sensor 1/2/3/4 sensing value | Gravity sensor determined angle | First display unit state | Second display unit state | Availability of keyboard |
|---|---|---|---|---|---|
| First Mode | 0/1/0/1 | Null | Working state | Non-working state | No |
| Second Mode | 1/0/1/0 | Null | Non-working state | Working state | No |
| Third Mode | 0/1/1/1 | >75° | Non-working state/output background image | Working state | Yes |
| Fourth Mode | 1/0/1/1 | >75° | Working state | Non-working state/output background image | Yes |
| Fifth Mode | 0/1/1/1 | 10°-75° | Working state | Non-working state | No |
| Sixth Mode | 1/0/1/1 | 10°-75° | Non-working state | Working state | No |

In some embodiments, if the Hall sensor senses the Hall component, then the sensing value of the Hall sensor will be 0, otherwise the sensing value will be 1. Since in the first mode, the second surface of the first body of the electronic device is in contact with the second surface of the second body, at this time, the Hall sensor 1 can sense the first sensing component 801, and the Hall sensor 3 can sense the second sensing component 802, while the Hall sensor 2 and Hall sensor 4 cannot sense any sensing component. Therefore, in the first mode, the sensing values of Hall sensors 1/2/3/4 are 0, 1, 0, 1 in sequence, and the corresponding sensing values of Hall sensors 1/2/3/4 are 0/1/0/1.

At the same time, in the first mode, there is no need to consider the angle between the first body and the second body determined by the first gravity sensor and the second gravity sensor, therefore, the angle determined by the gravity sensor in the first mode can be null.

For other modes, the sensing value of each sensor can be determined by combining FIG. 8 and the tablet above, which will not be described again.

In addition, in the present disclosure, the electronic device may also include a switch. The switch may be used to trigger switching of the working states of the first display unit and the second display unit.

Correspondingly, the control device of the electronic device may detect that the conversion switch is triggered, and control the switching of the working states of the first display unit and the second display unit.

For example, at a first time, the first display unit is in eh working state and the second display unit is in the non-working state, then in response to the switch being trigger, the first display unit can be switched to the non-working state, and the second display unit can be switched to the working state.

Figure 9:
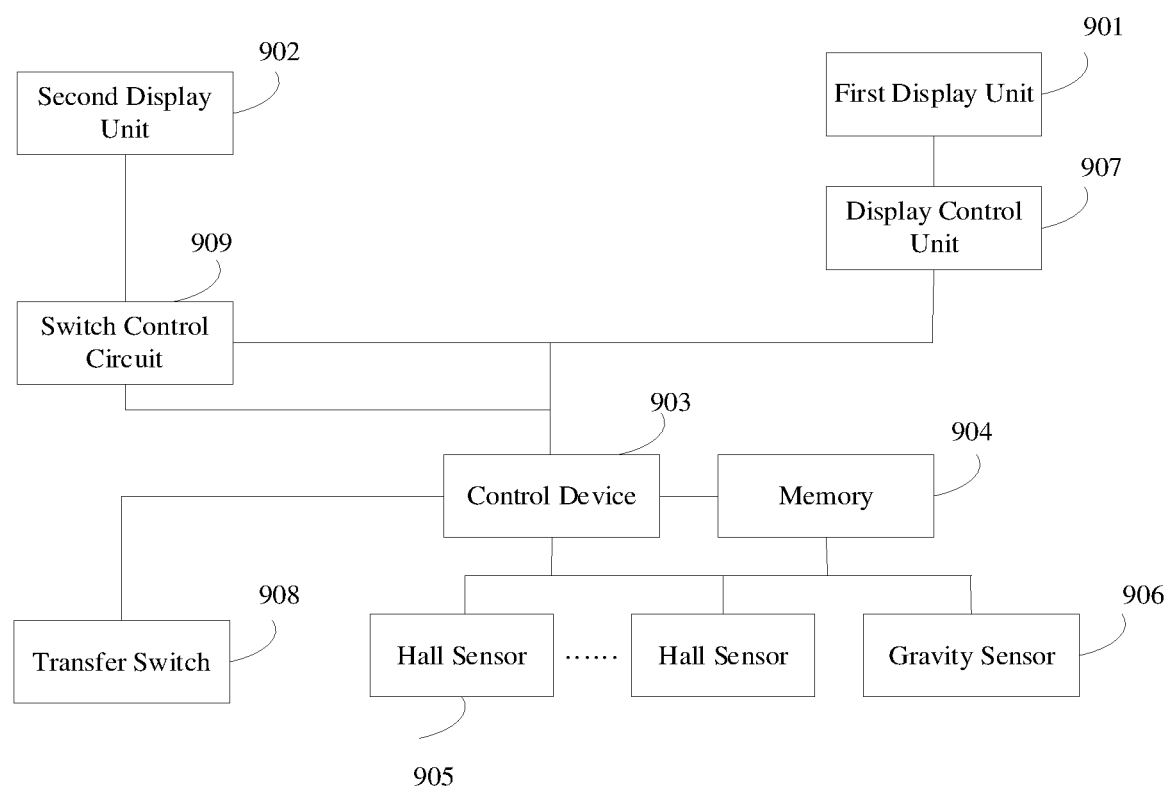
FIG. 9 is a schematic structural diagram of the electronic device according to an embodiment of the present disclosure.

FIG. 9 is a schematic structural diagram of the electronic device according to an embodiment of the present disclosure. As shown in FIG. 9, the electronic device includes a first display unit 901, a second display unit 902, a control device 903, and a memory 904.

In some embodiments, the first display unit may be disposed on the first surface of the first body of the electronic device, and the second display unit may be disposed on the second surface of the second body. For details, reference can be made to the relevant description provided above, which will not be repeated here.

In some embodiments, the control device 903 may be used to execute the display control method in any of the foregoing embodiments.

In some embodiments, the memory may be used to store programs required by the processor to perform operations.

In addition, as described above, the control device may also be connected to a variety of sensors, such as a Hall sensor 905 and a gravity sensor 906.

In addition, the first display unit 901 may also be connected to a display control unit 907, and the control device 903 may be connected to the first display unit through the display control unit.

In particular, the electronic device may also include a transfer switch 908 connected to the control device 903, and a switch control circuit 909 connected to the control device.

After the control device detects that the transfer switch 908 is triggered, the control device may control the switch control circuit to switch the working states of the first display unit and the second display unit. In some embodiments, the control command sent by the switch control circuit may also be sent to the display control unit of the first display unit through a programmable logic device.

Of course, the electronic device may also include an input unit such as a second collection unit, and an output unit such as an audio output unit, which is not limited in the embodiments of the present disclosure.

It should be understood that the electronic device may also include more or fewer components than those shown in FIG. 9, which is not limited to the embodiments of the present disclosure.

The present disclosure also provides a computer-readable storage medium. The computer-readable storage medium stores at least one instruction, at least one section of a program, a code set, or an instruction set. At least one instruction, at least one section of the program, the code set or the instruction set will be loaded and executed by a processor to implement the display control method described in any one of the above-described embodiments.

The present disclosure also provides a computer program. The computer program includes computer instructions. The computer instructions may be stored in the computer-readable storage medium. The computer program is executed by an electronic device to perform the display control method described in any one of the above-described embodiments.

Embodiments in this specification may be described in a progressive manner. The features described in embodiments of the specification may be replaced or combined with each other. Each embodiment focuses on the differences from other embodiments. The same or similar parts between embodiments may be referred to each other. For device embodiments, since device embodiments are basically similar to method embodiments, the description is relatively simple. For related parts, please refer to a portion of the description of method embodiments.

In this specification, relational terms such as first and second are only used to distinguish one entity or operation from another entity or operation and do not necessarily require or imply any such actual relationship or order between these entities or operations. Moreover, the terms "including," "containing," or any other variations thereof are intended to cover non-exclusive inclusion, so that an item or a device including a series of processes, methods, articles, or devices of the elements includes not only those elements, but also other elements that are not explicitly listed, or elements inherent to such processes, methods, articles, or devices. If there are no more restrictions, the element defined by the sentence "including a" does not exclude the existence of another same element in the item or device that includes the processes, methods, articles, or devices of the above elements.

The foregoing description of the disclosed embodiments enables those skilled in the art to implement or use the present disclosure. Various modifications to these embodiments are obvious to those skilled in the art. The general principles defined herein may be implemented in another embodiment without departing from the spirit or scope of the present disclosure. Therefore, the present disclosure is not limited to embodiments shown in this specification, but should conform to the widest scope consistent with the principles and novel features disclosed in the present disclosure.

The above are only some embodiments of the present disclosure. Those of ordinary skill in the art, without departing from the principles of the present disclosure, several improvements and modifications may be made, and these improvements and modifications should be within the scope of the present disclosure.

What is claimed is:

1. A display control method comprising:
    determining a first relative positional relationship between a first surface and/or a second surface of a first body of an electronic device and a first surface of a second body of the electronic device, the first relative positional relationship being related to at least one of a first rotation of the first body relative to the second body or a second rotation of the first body relative to the second body, a first display unit being disposed on the first surface of the first body, a second display unit being disposed on the second surface of the first body, the first rotation and the second rotation being different types of spatial rotation; and
    controlling at least one of the first display unit or the second display unit to be in a working state based on the first relative positional relationship, including:
        in response to the first relative positional relationship indicating that the second surface of the first body is in contact with the first surface of the second body, controlling the first display unit to be in the working state and the second display unit to be in a non-working state; and
        in response to the first relative positional relationship indicating that the first surface of the first body is in contact with the first surface of the second body, controlling the second display unit to be in the working state and the first display unit to be in the non-working state.

2. The display control method of claim 1, wherein controlling the at least one of the first display unit or the second display unit to be in the working state based on the first relative positional relationship further includes:
determining a mode of the electronic device based on the first relative positional relationship; and
controlling the at least one of the first display unit and the second display unit to be in the working state based on the mode of the electronic device.

3. The display control method of claim 2, wherein:
determining the mode of the electronic device based on the first relative positional relationship includes:
determining that the electronic device is in a first mode in response to the first relative positional relationship indicating that the second surface of the first body is in contact with the first surface of the second body;
determining that the electronic device is in a second mode in response to the first relative positional relationship indicating that the first surface of the first body is in contact with the first surface of the second body; and
controlling the at least one of the first display unit or the second display unit to be in the working state based on the mode of the electronic device includes:
controlling the first display unit to be in the working state and the second display unit to be in the non-working state in response to the electronic device being in the first mode; and
controlling the second display unit to be in the working state and the first display unit to be in the non-working state in response to the electronic device being in the second mode.

4. The display control method of claim 1, further comprising, while determining the first relative positional relationship:
determining a second relative positional relationship between the first body and the second body, the second relative positional relationship being related to the first rotation of the first body relative to the second body, wherein:
controlling the at least one of the first display unit or the second display unit to be in the working state based on the first relative positional relationship further includes:
controlling the at least one of the first display unit or the second display unit to be in the working state based on the first relative positional relationship and the second relative positional relationship.

5. The display control method of claim 4, wherein controlling the at least one of the first display unit or the second display unit to be in the working state based on the first relative positional relationship and the second relative positional relationship includes:
determining a mode of the electronic device based on the first relative positional relationship and the second relative positional relationship; and
controlling the at least one of the first display unit or the second display unit to be in the working state based on the mode of the electronic device.

6. The display control method of claim 5, wherein:
determining the mode of the electronic device based on the first relative positional relationship and the second relative positional relationship includes:
determining that the electronic device is in a third mode in response to the first relative positional relationship indicating that the second surface of the first body faces the first surface of the second body, and the second relative positional relationship indicating that the first body and the second body satisfy a first angle condition;
determining that the electronic device is in a fourth mode in response to the first relative positional relationship indicating that the first surface of the first body faces the first surface of the second body, and the second relative positional relationship indicating that the first body and the second body satisfy the first angle condition; and
controlling the at least one of the first display unit or the second display unit to be in the working state based on the mode of the electronic device further includes:
controlling the second display unit to be in the working state in response to the electronic device being in the third mode; and
controlling the first display unit to be in the working state in response to the electronic device being in the fourth mode.

7. The display control method of claim 5, wherein:
determining the mode of the electronic device based on the first relative positional relationship and the second relative positional relationship includes:
determining that the electronic device is in a fifth mode in response to the first relative positional relationship indicating that the second surface of the first body faces the first surface of the second body, and the second relative positional relationship indicating that the first body and the second body satisfy a second angle condition;
determining that the electronic device is in a sixth mode in response to the first relative positional relationship indicating that the first surface of the first body faces the first surface of the second body, and the second relative positional relationship indicating that the first body and the second body satisfy the second angle condition; and
controlling the at least one of the first display unit or the second display unit to be in the working state based on the mode of the electronic device further includes:
controlling the first display unit to be in the working state and the second display unit to be in the non-working state in response to the electronic device being in the fifth mode; and
controlling the second display unit to be in the working state and the first display unit to be in the non-working state in response to the electronic device being in the sixth mode.

8. The display control method of claim 7, further comprising:
while or after determining that the electronic device is in the fifth or the sixth mode, determining a third relative positional relationship between a first side of the first body and a second side of the first body, the first side being a side where the first body and the second body are connected, the second side being parallel to the first side;
after controlling the first display unit to be in the working state when the electronic device is in the fifth mode, adjusting a display screen presentation mode of the first display unit in response to the third relative positional relationship indicating that the first side is located above the second side; and
after controlling the second display unit to be in the working state when the electronic device is in the sixth mode, adjusting the display screen presentation mode of the second display unit in response to the third relative positional relationship indicating that the first side is located above the second side.

9. An electronic device comprising:
a first body, a first display unit being disposed on a first surface of the first body, a second display unit being disposed on a second surface of the first body, the first surface and the second surface being mutually parallel planes of the first body;
a second body, the first body being configured to perform a first rotation and a second rotation relative to the second body, the first rotation and the second rotation being different types of spatial rotation; and
a control device configured to control at least one of the first display unit or the second display unit to be in a working state based on a first relative positional relationship between the first surface and/or the second surface of the first body and a first surface of the second body, controlling the at least one of the first display unit or the second display unit to be in the working state based on the first relative positional relationship including:
in response to the first relative positional relationship indicating that the second surface of the first body is in contact with the first surface of the second body, controlling the first display unit to be in the working state and the second display unit to be in a non-working state; and
in response to the first relative positional relationship indicating that the first surface of the first body is in contact with the first surface of the second body, controlling the second display unit to be in the working state and the first display unit to be in the non-working state.

10. The electronic device of claim 9 further comprising:
a plurality of first sensors connected to the control device, wherein:
the control device is further configured to determine the first relative positional relationship based on sensing values of the plurality of first sensors.

11. A non-transitory computer-readable storage medium containing computer-executable instructions for, when executed by one or more processors, performing a display control method, the method comprising:
determining a first relative positional relationship between a first surface and/or a second surface of a first body of an electronic device and a first surface of a second body of the electronic device, the first relative positional relationship being related to at least one of a first rotation of the first body relative to the second body or a second rotation of the first body relative to the second body, a first display unit being disposed on the first surface of the first body, a second display unit being disposed on the second surface of the first body, the first rotation and the second rotation being different types of spatial rotation; and
controlling at least one of the first display unit or the second display unit to be in a working state based on the first relative positional relationship, including:
in response to the first relative positional relationship indicating that the second surface of the first body is in contact with the first surface of the second body, controlling the first display unit to be in the working state and the second display unit to be in a non-working state; and
in response to the first relative positional relationship indicating that the first surface of the first body is in contact with the first surface of the second body, controlling the second display unit to be in the working state and the first display unit to be in the non-working state.

12. The non-transitory computer-readable storage medium of claim 11, wherein controlling the at least one of the first display unit or the second display unit to be in the working state based on the first relative positional relationship further includes:
determining a mode of the electronic device based on the first relative positional relationship; and
controlling the at least one of the first display unit or the second display unit to be in the working state based on the mode of the electronic device.

13. The non-transitory computer-readable storage medium of claim 12, wherein:
determining the mode of the electronic device based on the first relative positional relationship includes:
determining that the electronic device is in a first mode in response to the first relative positional relationship indicating that the second surface of the first body is in contact with the first surface of the second body;
determining that the electronic device is in a second mode in response to the first relative positional relationship indicating that the first surface of the first body is in contact with the first surface of the second body; and
controlling the at least one of the first display unit or the second display unit to be in the working state based on the mode of the electronic device further includes:
controlling the first display unit to be in the working state and the second display unit to be in the non-working state in response to the electronic device being in the first mode; and
controlling the second display unit to be in the working state and the first display unit to be in the non-working state in response to the electronic device being in the second mode.

14. The non-transitory computer-readable storage medium of claim 11, wherein the method further comprises, while determining the first relative positional relationship:
determining a second relative positional relationship between the first body and the second body, the second relative positional relationship being related to the first rotation of the first body relative to the second body, wherein:
controlling the at least one of the first display unit or the second display unit to be in the working state based on the first relative positional relationship further includes:
controlling the at least one of the first display unit or the second display unit to be in the working state based on the first relative positional relationship and the second relative positional relationship.

15. The non-transitory computer-readable storage medium of claim 14, wherein controlling the at least one of the first display unit or the second display unit to be in the working state based on the first relative positional relationship and the second relative positional relationship includes:
determining a mode of the electronic device based on the first relative positional relationship and the second relative positional relationship; and
controlling the at least one of the first display unit or the second display unit to be in the working state based on the mode of the electronic device.

16. The non-transitory computer-readable storage medium of claim 15, wherein:
- determining the mode of the electronic device based on the first relative positional relationship and the second relative positional relationship includes:
  - determining that the electronic device is in a third mode in response to the first relative positional relationship indicating that the second surface of the first body faces the first surface of the second body, and the second relative positional relationship indicating that the first body and the second body satisfy a first angle condition;
  - determining that the electronic device is in a fourth mode in response to the first relative positional relationship indicating that the first surface of the first body faces the first surface of the second body, and the second relative positional relationship indicating that the first body and the second body satisfy the first angle condition; and
- controlling the at least one of the first display unit or the second display unit to be in the working state based on the mode of the electronic device further includes:
  - controlling the second display unit to be in the working state in response to the electronic device being in the third mode; and
  - controlling the first display unit to be in the working state in response to the electronic device being in the fourth mode.

17. The non-transitory computer-readable storage medium of claim 15, wherein;
- determining the mode of the electronic device based on the first relative positional relationship and the second relative positional relationship includes:
  - determining that the electronic device is in a fifth mode in response to the first relative positional relationship indicating that the second surface of the first body faces the first surface of the second body, and the second relative positional relationship indicating that the first body and the second body satisfy a second angle condition;
  - determining that the electronic device is in a sixth mode in response to the first relative positional relationship indicating that the first surface of the first body faces the first surface of the second body, and the second relative positional relationship indicating that the first body and the second body satisfy the second angle condition; and
- controlling the at least one of the first display unit or the second display unit to be in the working state based on the mode of the electronic device further includes:
  - controlling the first display unit to be in the working state and the second display unit to be in the non-working state in response to the electronic device being in the fifth mode; and
  - controlling the second display unit to be in the working state and the first display unit to be in the non-working state in response to the electronic device being in the sixth mode.

18. The non-transitory computer-readable storage medium of claim 17, wherein the method further comprises:
- while or after determining that the electronic device is in the fifth or the sixth mode, determining a third relative positional relationship between a first side of the first body and a second side of the first body, the first side being a side where the first body and the second body are connected, the second side being parallel to the first side;
- after controlling the first display unit to be in the working state when the electronic device is in the fifth mode, adjusting a display screen presentation mode of the first display unit in response to the third relative positional relationship indicating that the first side is located above the second side; and
- after controlling the second display unit to be in the working state when the electronic device is in the sixth mode, adjusting the display screen presentation mode of the second display unit in response to the third relative positional relationship indicating that the first side is located above the second side.

* * * * *